United States Patent [19]

Akamatsu et al.

[11] Patent Number: 5,364,735
[45] Date of Patent: Nov. 15, 1994

[54] MULTIPLE LAYER OPTICAL RECORD MEDIUM WITH PROTECTIVE LAYERS AND METHOD FOR PRODUCING SAME

[75] Inventors: Junichi Akamatsu, Saitama; Masato Yamamura, Chiba, both of Japan

[73] Assignee: Sony Corporation, Tokyo, Japan

[21] Appl. No.: 935,464

[22] Filed: Aug. 27, 1992

Related U.S. Application Data

[63] Continuation of Ser. No. 455,400, Feb. 23, 1990, abandoned.

[30] Foreign Application Priority Data

Jul. 1, 1988 [JP] Japan .................. 63-164161
Jul. 1, 1988 [JP] Japan .................. 63-164163

[51] Int. Cl.$^5$ ............................................ G03C 1/72
[52] U.S. Cl. ................................. 430/271; 430/273;
430/495; 430/523; 430/531; 430/945; 369/283;
369/286; 283/93; 283/94
[58] Field of Search ............... 430/271, 272, 273, 321,
430/495, 496, 945, 523, 531; 369/275.5, 283,
284, 285, 286; 427/162, 164, 289, 177, 428, 293;
283/904, 93, 94, 109

[56] References Cited

U.S. PATENT DOCUMENTS

| | | | |
|---|---|---|---|
| 4,252,889 | 2/1981 | Tinet et al. | 430/290 |
| 4,288,510 | 9/1981 | Tinet et al. | 430/11 |
| 4,334,007 | 6/1982 | Tinet et al. | 430/270 |
| 4,340,655 | 7/1982 | Hollister et al. | 430/523 |
| 4,389,719 | 6/1983 | Van de Donk et al. | 428/463 |
| 4,397,923 | 8/1983 | Yasuda et al. | 428/421 |
| 4,410,581 | 10/1983 | Nam | 428/195 |
| 4,590,493 | 5/1986 | Inoue et al. | 430/495 |
| 4,731,755 | 3/1988 | Bjorklund et al. | 365/127 |
| 4,735,878 | 4/1988 | Hamersley et al. | 430/11 |
| 4,839,883 | 6/1989 | Nagata et al. | 430/945 |
| 4,879,205 | 11/1989 | Suzuki | 430/272 |
| 4,889,746 | 12/1989 | Utsumi et al. | 427/162 |
| 4,897,829 | 1/1990 | Ikoma et al. | 428/634 |
| 4,954,379 | 9/1990 | Nishida et al. | 430/945 |
| 4,956,215 | 9/1990 | Fujita et al. | 430/11 |
| 4,983,505 | 1/1991 | Higuchi et al. | 430/495 |
| 5,008,129 | 4/1991 | Baling et al. | 430/523 |
| 5,147,701 | 9/1992 | Furukawa et al. | 420/64 |

FOREIGN PATENT DOCUMENTS

| | | |
|---|---|---|
| 268482 | 6/1981 | European Pat. Off. . |
| 265461 | 4/1987 | European Pat. Off. . |
| 135649 | 11/1976 | Japan . |
| 38655 | 3/1980 | Japan . |
| 10350 | 1/1988 | Japan . |

OTHER PUBLICATIONS

Patent Abstracts of Japan, vol. 7, No. 26, Feb. 2, 1983 and JP-570181443 (Andou).
Patent Abstracts of Japan, vol. 8, No. 45, Feb. 28, 1984 and JP 58-196636 (Azmuma).
Patent Abstracts of Japan, vol. 10, No. 225, Aug. 6, 1986, JP-61-59541.
Patent Abstracts of Japan, vol. 10, No. 348, Nov. 22, 1986 and JP-61-148645 (Ueno).
Patent Abstracts of Japan, vol. 10, No. 152, Jun. 3, 1986 and JP-61-5451 (Matsubara).

*Primary Examiner*—Lee C. Wright
*Attorney, Agent, or Firm*—Lewis H. Eslinger; Jay H. Maioli

[57] ABSTRACT

An optical recording medium in which a recording layer (4) on which optically readable data are recorded is formed on a rectangular base material (1), a protective layer (5) is formed by roll coating on the recording layer (4) and wherein the base material (1) on which the recording layer (4) and the protective layer (5) have been formed is cut into a predetermined shape. The protective layer (5) provided on the recording layer (4) is formed of a material having a low Young modulus and a lower thermal conductivity as compared with the base material.

6 Claims, 5 Drawing Sheets

5,364,735

MULTIPLE LAYER OPTICAL RECORD MEDIUM WITH PROTECTIVE LAYERS AND METHOD FOR PRODUCING SAME

This is a continuation of application Ser. No. 07/,455,400 filed Feb. 23, 1990 now abandoned.

FIELD OF THE INVENTION

This invention relates to an optical recording medium and the method for producing the same, and may be applied to an optical card and an optical disk wherein a recording layer on which optically readable data are recorded is formed on a substrate or base material.

BACKGROUND OF ART

An optical card, used as various data memory cards, such as cash cards, credit cards or identification certificate cards, is of such a construction that a recording layer on which are recorded optically readable data is formed with the interposition of a protective film and a protective layer is laminated on the recording layer with the interposition of a protective layer. On the surface of the protection film, there is printed either information on the method of using the cards or decorative patterns.

The principle of recording and reproducing data in the optical card is to distinguish the difference in the transmissivity or reflectivity of the recording layer and to convert the difference into electrical signals. As the recording layer, thin films of metal or alloy or thin films of organic materials, such as dyestuffs, capable of optically recording or reproducing data, are employed. The recording layer need be formed as an optically homogeneous medium. In general, the recording layer formed by a thin film of the metals or alloys is formed on a base material by vacuum film forming techniques, such as evaporation or sputtering, whereas the recording layer formed by a thin film of the organic material is formed by coating the organic dyestuff on the base material by a spin coater or a roll coater.

The above mentioned protective layer for mechanical protection of the recording layer and maintenance of environmental properties, such as resistance to high temperature, high humidity or chemical pollution, is generally formed of an UV curing resin.

The UV curing resin, now used extensively, is superior in general properties as a protective layer, however, it has a higher Young modulus (modulus of elasticity) such that it is deformed markedly against mechanical stresses such as compression, tension or bending and unable to assure sufficient protection of the recording layer.

In general, the UV curing resin has a high cross-linking density and a higher thermal conductivity, as thermal properties, which are not desirable as recording properties, because they affect recording sensitivity. That is, when recording with a semiconductor laser element, for example, for forming a predetermined recording pit, the laser power may fall short depending on the type of the protective layer. Above all, in optical recording, with an optical card in need of a larger pit and low speed recording conditions, it is critical to elevate the recording sensitivity, such that a demand is raised for the resin of the protective layer having these thermal properties.

On the other hand, for producing the above mentioned optical card, necessary data are printed in advance on a roll-shaped protective film, such as by silk screen printing or offset printing, the printed protective film is laminated on a recording layer provided on the base material, and the optical card is punched from the laminated base material to a desired shape.

With the conventional method, in which the protective film having the necessary data printed thereon is laminated on the recording layer formed on the base material and the optical card is punched from it to a desired shape, it is necessary to realize high precision positioning of the protective film with the base material having the recording layer formed thereon. For example, it is necessary to provide positioning markers in the base material and the protective film and to perform a positioning operation on the basis of these markers. When various data are provided by multi-color printing on the protective film, a number of printing steps equal to the number of colors is necessitated, and the roll of the protective film must be rewound and set on a printer for each printing step, while a high precision is required for positioning in the printing process. For printing on the protective film by the silk printing or offset printing methods, a professional grade of a printing equipment is necessitated. Since a high precision is necessitated in positioning with the conventional manufacture method, the yield of production of optical cards is low and production costs are elevated, so that the conventional method is not suited to the multiple species, small quantity production of optical cards.

On the other hand, an optical card is usually formed in a rectangular shape and, if such card is prepared one by one using a rectangular base material, it is difficult to form an optically homogeneous recording layer by vacuum film forming or spin coating during the production process, such that it is difficult with the conventional manufacture method to stably produce high quality products. Above all, in case of spin coating, paints proceed to the reverse sides at the corners of the rectangular base material to lower the production yield of the rectangular base material and to raise the production costs.

It is therefore an object of the present invention to provide an optical recording medium, such as an optical card or an optical disk, which is improved in recording sensitivity or reliability. It is also an object of the present invention to enable a high quality optical recording medium to be produced stably so that the production yield is elevated to lower the production costs and the multiple species small quantity production is facilitated.

DISCLOSURE OF THE INVENTION

An optical recording medium according to the present invention is characterized in that it comprises a light transmissive rectangular base material, a recording layer which is provided on said base material and which may be optically read out, and a protective layer provided on said recording layer by roll coating, wherein said base material on which said recording layer and the protective layer are formed is cut into desired shapes.

The optical recording medium according to the present invention is also characterized in that a base plate having light transmissivity, a recording layer provided on said base plate and on which optically readable data are recorded, and a protective layer provided on said recording layer and having a low modulus of elasticity.

The protective layer formed by the material of a lower Young modulus can sufficiently protect the recording layer without imparting excessive deformation to the recording layer against mechanical stresses such as compression, tension or bending.

The optical recording medium according to the present invention is also characterized in that the above protective layer is formed of a material having a Young modulus of not higher than $2 \times 10^{10}$ dyn/cm$^2$.

The optical recording medium according to the present invention is characterized in that the above protective layer is formed of a material having a lower thermal conductivity as compared with the base plate.

The material of the low Young modulus forming the protective layer is a UV curing resin having a Young modulus of not more than $2 \times 10$ dyn/cm$^2$.

The method for producing the recording medium according to the present invention is characterized in that the protective layer is provided on the protective layer formed during said second step after said second step and before said third step.

The pre-processing step comprises the step of forming a hard coating layer on said base material and the step of forming a protective layer by a roll coater on the produced hard coating layer.

The method for producing the optical recording medium according to the present invention is characterized in that said protective layer is formed during the second step by a material of a low Young modulus and a lower thermal conductivity than the base material.

The recording layer thus formed of a material having a lower thermal conductivity does not lower the recording sensitivity of the recording layer.

The protective layer having the low Young modulus and the low thermal conductivity may be formed of polyurethane or rubber type UV curing resins.

According to the present invention, by forming the protective layer from a low Young modulus and low thermal conductivity material, an optical recording medium is provided, such as an optical card or disk, is provided, which is improved in recording sensitivity and reliability. A method for producing an optical recording medium according to the present invention includes a first step of forming a recording layer on a rectangular base material, a second step of forming a protective layer by roll coating on the recording layer formed in said first step, and a third step of cutting the base material, on which the recording layer and the protective layer are formed by said first and second steps, into predetermined shapes.

The above mentioned first step comprises a sub-step of forming a high reflectivity layer, a sub-step of forming a resist layer on the high reflectivity layer formed by the last mentioned sub-step, a sub-step of subjecting the high resist layer formed by the last mentioned sub-step to mask exposure and a sub-step of etching the high reflectivity layer subjected to mask exposure in the last mentioned substep.

The recording layer may be formed as a homogeneous thin film of an organic material by roll coating on the above mentioned rectangular base material. The recording layer may be formed by vacuum film forming, such as by evaporation or sputtering of a metal or alloy, capable of optically recording the data or information. The protective layer may be formed by roll coating on the recording layer efficiently to a uniform thickness.

With the method of producing the recording medium of the present invention, the recording layer and the protective layer are formed on the rectangular base material which is than divided by cutting into a predetermined shape to produce the optical recording media with high production efficiency.

The method for producing the optical recording medium according to the present invention is characterized by including a pre-processing step of pre-processing the base material in advance of the first step.

The protective film may be provided in advance to printing.

The method for producing the optical recording medium according to the present invention is characterized by comprising the step of printing on said protective film cut by said third step.

Printing may be made on the protective film of the base material cut by the third step.

According to the method for producing the optical recording medium of the present invention, the base material on which the protective film is laminated is cut to a predetermined shape, after which printing is made by pad printing on the protective layer of each recording medium, so that high positioning precision is not necessitated in laminating the protective film and the production yield of the optical recording medium is elevated while its production costs are lowered. In addition, since the necessary data may be printed on the protective film for each-recording medium, thus enabling multiple species small quantity production of optical cards.

BEST EMBODIMENT FOR PRACTICING THE INVENTION

Figure 1:
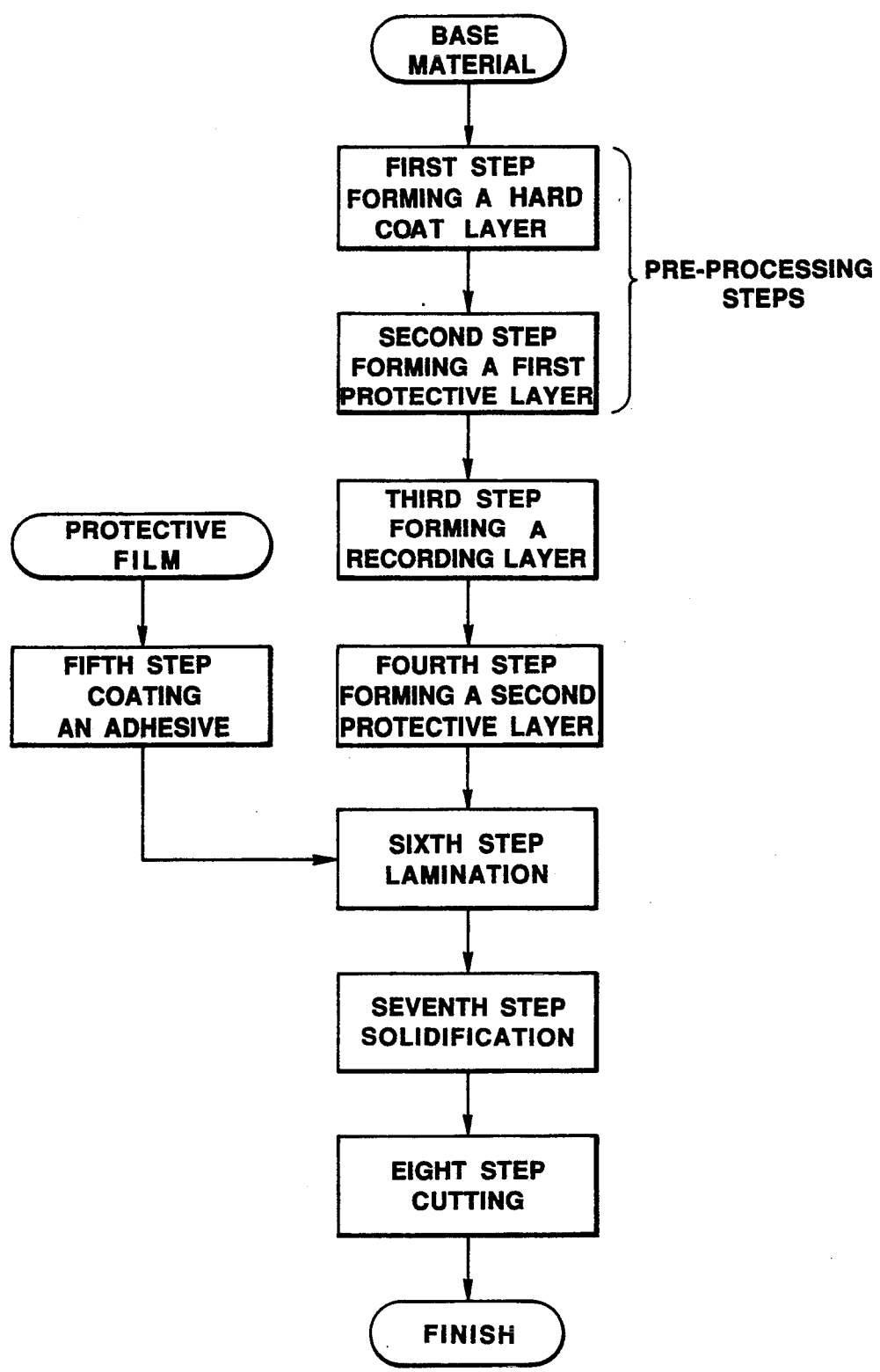
FIG. 1 is a flow chart showing an embodiment of the method according to the present invention.

By referring to the drawings, certain preferred embodiments of the present invention will be explained in detail.

Figure 2:
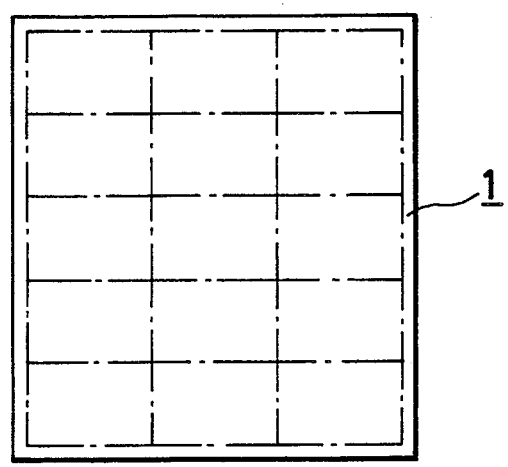
FIG. 2 is a plan view of a base plate employed in the above embodiment.
Figure 3:
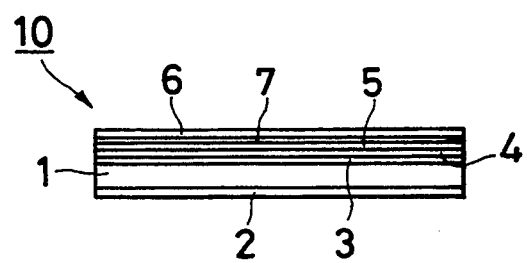
FIG. 3 is a cross-sectional view showing a card base plate formed in the above embodiment.
Figure 4:
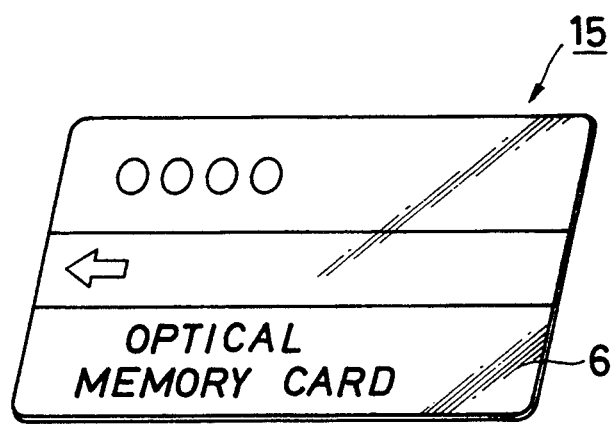
FIG. 4 is a perspective view showing the appearance of an optical card formed in the above embodiment.

A polycarbonate plate $260 \times 272$ mm in size and 0.7 mm in thickness, as shown in FIG. 2, was prepared as a rectangular base plate 1, and a card base material 10 having a cross-sectional shape as shown in FIG. 3 was formed from the transparent polycarbonate plate by the production process shown in the flow chart of FIG. 1. This card base material 10 was cut into 15 write once memory cards 15, each being $54 \times 86$ mm in size and having an appearance as shown in FIG. 4.

Referring to the flow chart of FIG. 1 a UV curing resin was coated in a first step by a roll coater on one surface (data read-out surface) of the rectangular base plate 1, that is the transparent polycarbonate plate, to a thickness of several microns, to form a hard coat layer 2, for protecting the data read-out surface from scratches or contamination.

In a second step, a UV curing resin is coated by a roll coater on the other surface (data recording surface) of the rectangular base material 1, that is the transparent polycarbonate plate, to form a first protective layer 3.

These first and second steps are pre-processing steps for forming a recording layer 4 on the base material 1 in the next third step.

In the third step, an organic optical recording material as the recording medium for the optically recordable and reproducible data is coated to a thickness of several microns on the first protective layer 3 to form a recording layer 4.

In this third step, $Sb_2 Se_3$ and $Bi_2 Te_3$, which are calcogenide base alloys acting as the recording media for optically recordable and reproducible data, may be sequentially formed on the first protective layer 3 by vacuum forming techniques, such as vacuum evaporation or sputtering, to form the recording layer 4.

In the next fourth step, the UV curing resins are coated by a roll coater on the recording layer 4 to a thickness of several microns to form a second protective layer 5.

Figures 5, 6:
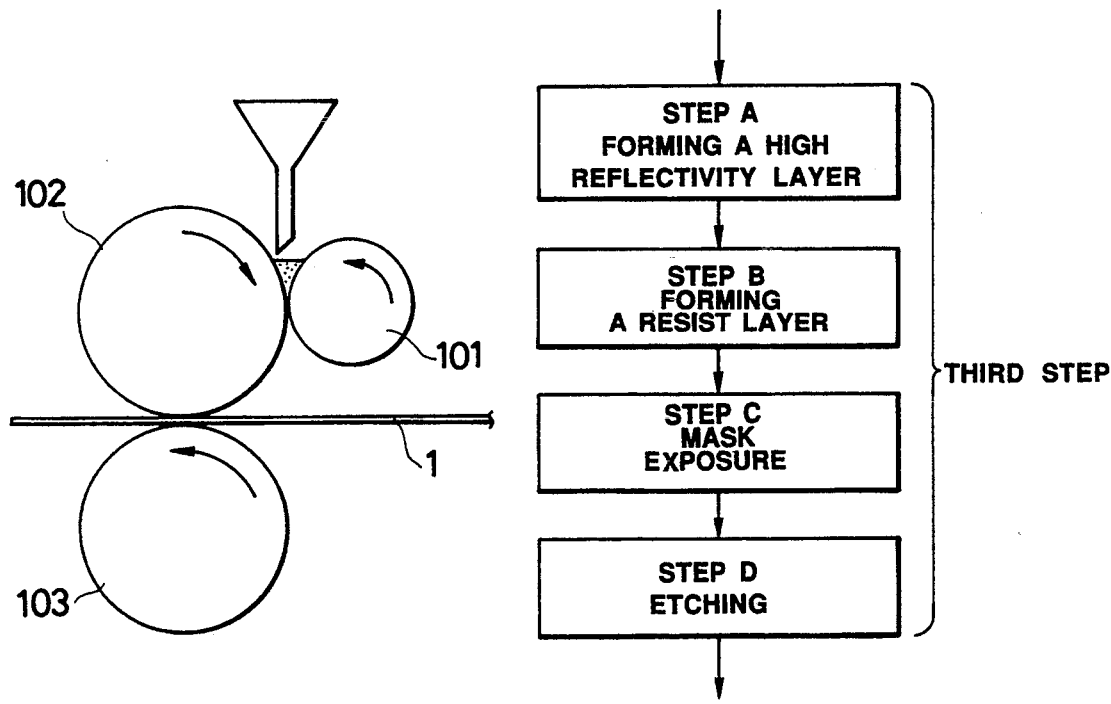
FIG. 5 is a diagrammatic view showing the fundamental structure of a roll coater employed in practicing the method of the present invention.
FIG. 6 is a flow chart showing the manufacturing process of the recording layer when modifying the above embodiment for producing the ROM type optical card.

In these first, second and third steps, a coating material is supplied to transfer contact portions of a first roll 101 and a second roll 102, and the base material 1 is passed while it is sandwiched between the first and the second rolls 102, 103 to apply the coating material to a desired thickness; as represented in FIG. 5.

By using the UV curing resins, such as acrylic resin, as the coating material, and adjusting its viscosity from several to several hundreds of centipoise, the acrylic resin could be uniformly applied to a thickness of several microns by the above mentioned roll coater, without the resin migrating to the other surface, to form the hard coat layer 2, the first protective layer 3 and the second layer 5.

By using the polyurethane or rubber UV curing resins as the coating material, the first protective layer 3 and the second Protective layer 5 could be formed, which have a lower Young modulus and a lower thermal conductivity as compared with the polycarbonate base plate 1.

As the UV curing resins for forming the protective layers 3, 5 having the lower Young modulus and the lower thermal conductivity, a sample i, manufactured by the Dainippon Ink Co. Ltd. under the trade name SD-17, a sample ii, manufactured by the Dainippon Ink Co. Ltd. under the trade name SD-301, and a sample iii, manufactured of the Three Bond Co. Ltd. under the trade name TB-3080, were employed.

The first protective layer 3 and the second protective layer 5 are formed in the manner of sandwiching the recording layer 4 for thermally protecting the base material 1, assuring the adhesion with the base material 1 and the protective film 6 as later described, and for protecting the recording layer 4, and may be formed with the use of thermosetting resins, according to the usage and the application.

In a sixth step, a roll-shaped polyester film having a thickness of 0.05 to 0.1 mm, is prepared as a protective film 6. In a fifth step, a thermosetting adhesive 7 is coated by a roll coater on one surface of the protective film 6 to a thickness of 10 to several tens of microns, and the above mentioned protective film 6 is laminated on the second protective layer 5 with the adhesive 7. On the protective film 6, there are previously applied necessary printing data.

In a seventh step, the adhesive 7 is solidified.

In an eighth step, the thus formed card base material 10, having the cross-sectional structure as shown in FIG. 3, is cut into the shape of desired cards, such as by punching or laser trimming. In the present embodiment, the above mentioned card base material is punched and cut by mold shaping into 15 write once memory cards 15, which is 54×86 mm in size, as shown in FIG. 4.

With the method of the present embodiment, consisting of the above mentioned first to eighth steps, the coating operation from the first to the fourth step is carried out in this order continuously by a roll coater to form the hard coat layer 2, the first protective layer 3, the recording layer 4 and the second protective layer 5 by roll coating to uniform thicknesses efficiently and optically homogeneously. In addition, the protective film 6 is laminated in the sixth step on the second protective layer 5 to form the card base material 10 which is cut the desired card shape at a time in the eighth step, so that the high quality write once memory cards 15 may be produced highly efficiently.

In the above embodiment, for producing the ROM or read only memory type optical card for reading out pre-recorded data, it is possible to change the third step of forming the recording layer 4 in the manufacture process in the flow chart of FIG. 1 as shown in FIG. 6.

That is, in FIG. 6, in step A, a high reflectivity layer formed of, for example, aluminum, is formed, by a vacuum film forming method, on the first protective layer 3, formed in the above mentioned second step. In the next step B, a resist layer is formed by coating a resist on the high reflectivity layer by a roll coater. In the next step C, desired data are formed on the resist layer by mask exposure. In the next step D, the high reflectivity layer is etched to form the ROM type recording layer 4 on which desired data are written previously.

Figure 7:
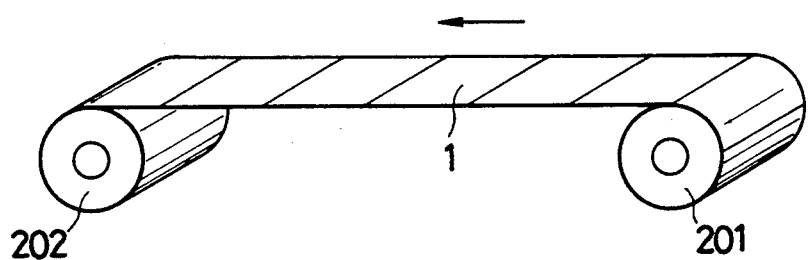
FIG. 7 is an explanatory view of the case of producing an optical card continuously according to a film carrier system.

For producing an optical card of a reduced thickness, a roll-shaped film of, for example, polycarbonate or polyester, having the thickness of 0.1 to 0.4 mm, is used as the rectangular base material 1. The above mentioned first to eighth steps are carried out, while the film base material 1 is taken up as shown in FIG. 7 from the first roll 201 to the second roll 202, to produce the optical card continuously in accordance with the film carrier system. In this case, when forming the recording layer 4 by the vacuum film forming method, such as evaporation or sputtering, the film feeding device for taking up the roll-shaped base material 1 from the first roll 201 onto the second roll 202 may be provided in its entirety in a vacuum chamber.

Meanwhile, desired printing may be performed after the eighth step on a card-by-card basis by a pad printer adapted for transferring the chalcographic printing data with the use of a transparent or plain white tint polyester film having a thickness of 50 to 400 μm.

Figure 8:
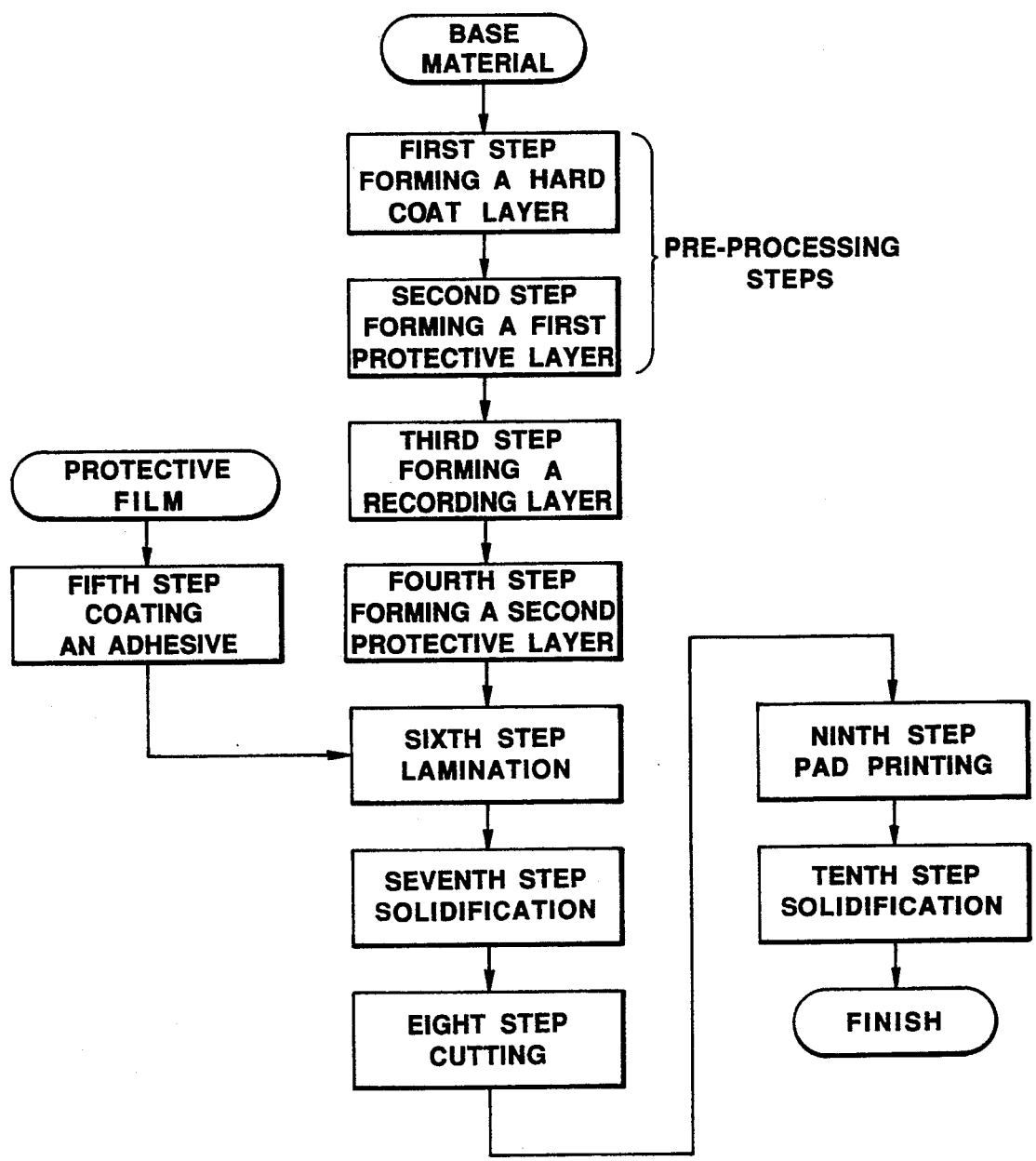
FIG. 8 is a flow chart showing another embodiment of the method of the present invention.
Figure 9:
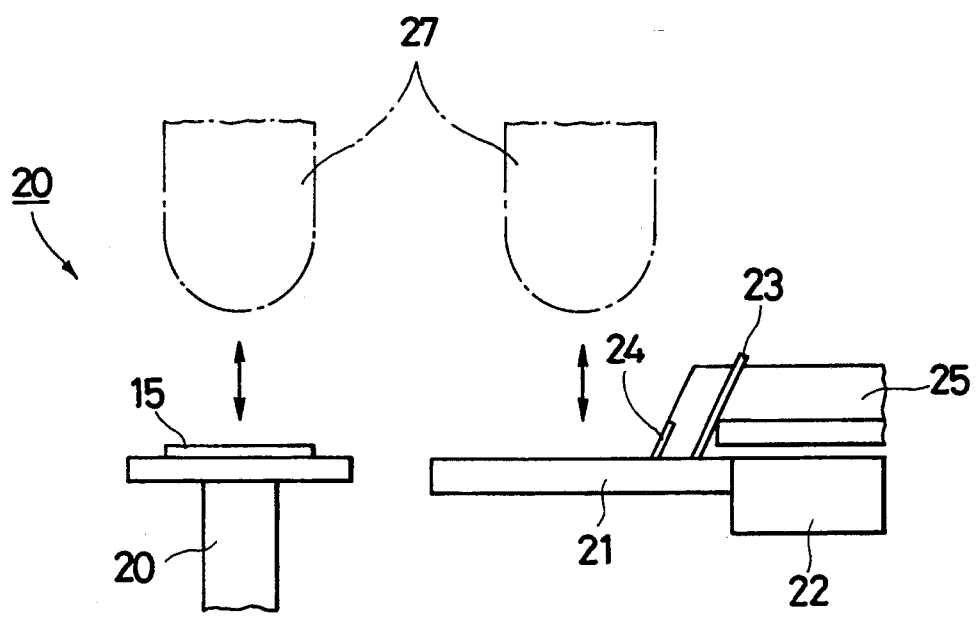
FIG. 9 is a diagrammatic view showing the fundamental structure of a pad printer employed in the above embodiment.

An embodiment shown in the flow chart of FIG. 8 includes a ninth step of printing the protective film 6 after the eighth step. In this ninth step, necessary data are printed on the surface of the protective film 6 on each optical card 15, formed in the eighth step to a size of 54×86 mm, by using a pad printer 20 having the structure shown in FIG. 9.

The pad printer 20 is formed by a chalcographic plate for data necessary for printing, a vistula 23 for applying ink in an ink reservoir 22 onto the chalcographic plate 21, a slider 25 provided with a doctor blade 24 for squeezing the plate 21 for removing the redundant ink on the plate 21, and pads 27 for transfer printing the data necessary for printing from the plate 21 onto the protective film 6 of the printing material, that is, the optical card 15, resting on a sample base 26. The ink pattern of the data is transferred from the plate 21 onto the pad 27 to apply the pad 27 to the protective film to transfer the ink pattern from the pad 27 onto the surface of the protective film 6 for printing.

With the above described pad printer 20, the necessary data may be transfer printed only by movement of the pad 27, provided the printing matter is set in advance, so that adjustment and automation may be facilitated and operability may be improved, while printing may be made with good productivity with a small mounting space. By mounting a number of pad printers simultaneously, multicolor printing may be performed efficiently.

In the tenth step, the ink pattern formed by transfer printing on the surface of the pad printer 20 is dried and solidified.

With the manufacture method of the present embodiment, consisting of the first to tenth steps, the recording layer 4 and the protective layer 5 are laminated on the rectangular base material 1 and the protective layer 6 is laminated on the protective layer 5 to form the card base material 10, which is then cut into desired card shape. Necessary data are then printed on the protective film 6 by pad printing on the card-by-card basis, so that high positioning accuracy is not necessitated in laminating the protective film 6 and hence the production yield may be improved to reduce the costs. On the other hand, since the necessary data are printed on a card-by-card basis, multiple species, small quantity production of the optical cards may be realized efficiently.

Although the recording layer 4 and the protective layer 5 are laminated on the rectangular base material 1, the recording layer and the protective layer may be formed by a spin coating method or vacuum film forming technique on a circular base material and the protective film may be laminated on the protective layer to form the card base material, which may then be cut into the desired card form. Pad printing may then be performed on the protective film of each card to improve the yield of production and to lower the costs to realize efficient multiple species the small quantity production of optical cards.

With the manufacture method shown in the flow chart of FIG. 1, a double-layer structure recording layer 4, formed by laminating the $Sb_2Se_3$ layer and the $Bi_2Te_3$ layer, each 400 A in thickness, was formed on a polycarbonate base material 1, which was 0.7 mm in thickness, to produce the optical card, in which the samples 1, 2 and 3 were formed on the recording layer 4, and the reproduction output was measured for comparison sake. The results are shown in Table 1.

TABLE 1

| sample | Young Modulus dyn/cm$^2$ | viscosity cps | reproducing output |
|---|---|---|---|
| sample 1: SD-17 | $2 \times 10^{10}$ | 20 | 1 |
| sample 2: SD-30 | $11.8 \times 10^{10}$ | 500 | 1.2 |

TABLE 1-continued

| sample | Young Modulus dyn/cm$^2$ | viscosity cps | reproducing output |
|---|---|---|---|
| sample 3: TB-3080 | $9.8 \times 10^7$ | 500 | 1.3 |

By forming the protective layer 5 of the UV curing resin having the Young modulus as low as $2 \times 10^{10}$ dyn/cm$^2$ and having a lower thermal conductivity than the base material 1, it becomes possible to improve the recording sensitivity and to relieve the stress on the recording layer 4 to realize the optical recording medium of higher reliability.

It is to be noted that the optical recording medium and the production method therefor according to the present invention is not limited to the optical card, as in the above described embodiment, but the optical disk having the disk-shaped outer configuration may be prepared by the present method.

I claim:
1. An optical recording medium comprising:
    a light transmissive base plate having a rectangular shape and being of a size for forming into a plurality of smaller, uniform shapes,
    a first protective layer formed of UV curing resin provided on a surface of said base plate,
    a metal recording layer which is provided on said first protective layer and containing data which may be optically read out,
    a second protective layer formed of UV curing resin provided on said recording layer by roll coating, and
    a polyester protective film adhered to said second protective layer by means of an adhesive layer applied between said protective film and said second protective layer.
2. The optical recording medium according to claim 1 wherein said second protective layer is formed of a material having a Young modulus of elasticity not higher than $2 \times 10^{10}$ dyn/cm$^2$.
3. An optical recording medium comprising:
    a base plate having light transmissivity and being of a size for forming into a plurality of smaller, uniform shapes,
    a first protective layer formed of UV curing resin provided on a surface of said base plate,
    a recording layer provided on said first protective layer and on which optically readable data are recorded,
    a second protective layer formed of UV curing resin provided on said recording layer and having a lower modulus of elasticity than a modulus of elasticity of said base plate and having a Young modulus of elasticity not higher than $2 \times 10^{10}$ dyn/cm$^2$, and
    a protective film formed of polyester adhered to said second protective layer by means of an adhesive layer applied to said protective film.
4. The optical recording medium according to claims 1 or 2 wherein said second protective layer is formed of a material having a lower thermal conductivity than the base material or the base plate.
5. The optical recording medium according to claims 1 or 2 wherein the smaller, uniform shape of said base plate having said recording layer, first and second protective layers, and protective film following dividing has the form of a rectangular card.
6. The optical recording medium according to claims 1 or 2 wherein the smaller, uniform shape of said base plate having said recording layer, first and second protective layers, and protective film following dividing has the form of a disk.

* * * * *

UNITED STATES PATENT AND TRADEMARK OFFICE
CERTIFICATE OF CORRECTION

PATENT NO. : 5,364,735
DATED : November 15, 1994
INVENTOR(S) : Junichi Akamatsu and Masato Yamamura It is certified that error appears in the above-identified patent and that said Letter Patent is hereby corrected as shown below:

Col.3, line 13, change "10" to --$10^{10}$--
Col.5, line 35, change ";" to --,--
      line 46, change "Protective" to --protective--
      line 61, delete "the" first occurrence
Col.6, line 14, change "is" to --are--
Col.7, line 29, change "I" to --1--

In the claims:
Col.8, line 56, change "2" to --3--
      line 60, change "2" to --3--
      line 65, change "2" to --3--

Signed and Sealed this

Twenty-seventh Day of January, 1998

BRUCE LEHMAN

*Attest:*

*Attesting Officer*      *Commissioner of Patents and Trademarks*